Patented Apr. 24, 1951

2,550,017

UNITED STATES PATENT OFFICE 2,550,017

ALKYL-AMINOALKYL ESTERS OF 3-BENZO-THIENYL-HYDROXYACETIC ACID

Gustav J. Martin, Philadelphia, and Souren Avakian, Orland, Pa., assignors to The National Drug Company, Philadelphia, Pa., a corporation of Pennsylvania No Drawing. Application November 8, 1948, Serial No. 59,023

6 Claims. (Cl. 260—330.5)

This invention relates to certain new benzothienyl esters and methods for their production.

It is an object of this invention to produce new chemotherapeutic compounds. A further object is to produce compounds which are particularly adapted for use as antispasmodics and antihistamines. A still further object is to produce new chemical compounds which may be employed as intermediates. Additional objects will become apparent from a consideration of the following description and claims.

The foregoing and other objects are obtained by means of our invention which is generally concerned with mono- and dialkyl-aminoalkyl esters of 3-benzothienylhydroxyacetic acid. This invention is particularly concerned with the foregoing compounds wherein a cyclic radical, preferably a phenyl, benzyl, cyclohexyl or thienyl radical is substituted on the alpha carbon of the acetic acid residue. Water soluble salts such as the hydrochloric salt of the described compounds are preferred for therapeutic purposes.

Our invention may be more readily understood by a consideration of the following illustrative examples.

*Preparation of phenyl-3-benzothienyl hydroxyacetic acid*

A solution of 3-benzothienyl magnesium bromide, prepared from 21.3 g. (0.1 mole) of 3-bromobenzothiophene, 2.9 gm. (.12 mole) of magnesium and 150 cc. of ether was added, dropwise, to 4.5 gm. (0.03 mole) of phenylglyoxylic acid dissolved in 50 cc. of ether. The temperature was kept between 5–10° C. during the addition. After addition the mixture was stirred for half an hour at room temperature, refluxed for one hour, cooled, and the ether layer discarded. The precipitate was washed with ether, treated with dilute hydrochloric acid and extracted with ether. The product was then extracted with sodium carbonate solution, the solution filtered, acidified and the product filtered. One crystallization from benzene gave 6.2 gm. of phenyl-3-benzothienyl-hydroxyacetic acid, melting at 136–137° C.

Phenyl-3-benzothienyl-hydroxyacetic acid may also be prepared as follows:

147 gm. (1.1 moles) of aluminum chloride was added portionwise to a mixture of 137 gm. (1 mole) of ethyl oxalyl chloride, 134 gm. (1 mole) of benzothiophene and 1200 cc. of tetrachloroethane. The reaction temperature was kept between 0–5° C. following the addition and then allowed to come to room temperature. After six hours, the mixture was treated with ice and hydrochloric acid. The solvent was separated, washed with dilute hydrochloric acid, aqueous sodium carbonate, water and dried over sodium sulfate. Distillation yielded 120 gm. of ethyl-3-benzothienyl glyoxylate.

A mixture of 50 gm. of the above ester, 100 cc. of alcohol, 60 gm. of sodium carbonate and 500 cc. of water was refluxed for ten hours, filtered and the solution evaporated under reduced pressure. The residue was acidified, extracted with ether, the extract washed with water, dried, and evaporated to dryness. Recrystallization from benzene gave 28 gm. of 3-benzothienyl glyoxylic acid.

A solution of phenyl magnesium bromide, prepared from 47.1 gm. (.3 mole) bromobenzene, 7.1 gm. (.31 mole) of magnesium, and 200 cc. of ether, was added to 20.6 gm. (1 mole) of 3-benzothienyl glyoxylic acid in 250 cc. of ether. The reaction mixture was treated in the manner described above. The purified product has the same melting point as that obtained from 2-benzothienyl magnesium bromide and phenylglyoxylic acid.

The following illustrates the general procedure employed for converting phenyl-3-benzothienyl-hydroxyacetic acid to the hydrochloride salt of the beta-diethylaminoethyl ester of phenyl-3-benzothienylhydroxyacetic acid:

A mixture of 4.6 gm. of phenyl-2-benzothienyl-hydroxyacetic acid, 2.5 gm. of beta-diethylaminoethyl chloride and 60 cc. of dry isopropyl alcohol was refluxed for ten hours. The solvent was evaporated under reduced pressure and the residue recrystallized from absolute alcohol-ether mixture. The pure ester hydrochloride melted at 164–165° C.

Theoretical S: 7.42%. Found: 7.40%.

In the above examples the corresponding cyclohexyl, benzyl and thienyl hydroxyacetic acid derivatives may be made by substituting cyclohexyl glyoxylic acid, benzyl glyoxylic acid or thienyl glyoxylic acid for the phenyl glyoxylic acid described therein. In the same manner other related derivatives of the described material may be made by suitable substitution of the intermediates employed.

Instead of the diethylamino derivatives of the foregoing compounds it is to be understood that other mono- or dialkyl amino compounds may be produced. For instance, mono- and dimethyl-amino compounds, monoethyl and monopropyl-amino compounds and dipropyl amino compounds may be produced. We prefer to have at least one alkyl group of from 1 to 3 carbon atoms substituted on the amino group and as a general rule we substitute two alkyl groups thereon.

Instead of beta-diethylaminoethyl chloride in the above examples other diethylamino alkyl chlorides may be employed thereby changing the length of the alkylene group in the molecule. This alkylene group should advisably contain no more than 6 carbon atoms. Compounds of this type may be produced by substituting for the foregoing alkyl chloride diethylaminomethyl chloride or diethylamino propyl-, butyl- or amyl chloride. As mentioned previously the diethylamino groups on these compounds may be replaced by other mono- or dialkylamino groups.

For therapeutic and other purposes it is frequently advisable to employ these compounds in the form of their water-soluble salts. A variety of suitable salts of this category may be produced such as the hydrochloride, the sulfate and similar soluble salts. As a general rule, we prefer to employ these compounds in the form of their hydrochloric acid salts.

The compounds of our invention may be used as intermediates for the production of a variety of other chemicals. They may be also employed as chemotherapeutic agents and particularly as antispasmodics and antihistamines. For therapeutic use these compounds may be administered orally, intramuscularly or intravenously. The dosage may vary widely depending upon the patient, the particular disorder for which the material is used, and the desires of the physician. An oral dose of from 50 to 200 milligrams a day for an adult in many cases will be sufficient.

As many apparently widely different embodiments of this invention may be made without departing from the spirit and scope hereof, it is to be understood that the invention is not limited to the specific embodiments hereof, except as defined in the appended claims.

We claim:

1. Compounds having the following general formula:

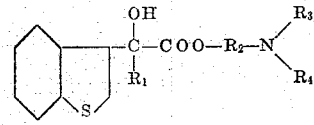

wherein $R_1$ represents a cyclic radical selected from the class consisting of phenyl, benzyl, cyclohexyl and thienyl groups, $R_2$ represents an alkylene group having from 1 to 6 carbon atoms, $R_3$ represents an alkyl group having from 1 to 3 carbon atoms, and $R_4$ represents a group selected from the class consisting of hydrogen and alkyl groups having from 1 to 3 carbon atoms, and their water-soluble salts.

2. Water-soluble salts of the compounds of claim 1.

3. Compounds having the following general formula:

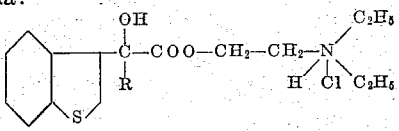

wherein R represents a cyclic radical selected from the class consisting of phenyl, benzyl, cyclohexyl and thienyl groups.

4. The beta-diethylaminoethyl ester of phenyl-3 - benzo - thienylhydroxyacetic acid said ester having the formula:

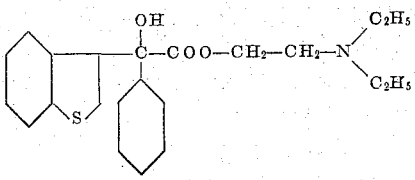

5. Water-soluble salts of the compound of claim 4.

6. The hydrochloride salt of the compound of claim 4.

GUSTAV J. MARTIN.
SOUREN AVAKIAN.

REFERENCES CITED

The following references are of record in the file of this patent:

Blicke: J. Am. Chem. Soc. 66 1645–1648 (1944).
Powers: "Advancing Fronts in Chemistry," vol. 2, pp. 32, 33 (1946).